United States Patent
Kidd et al.

(10) Patent No.: US 7,231,373 B2
(45) Date of Patent: Jun. 12, 2007

(54) TRANSACTION PROCESSING

(75) Inventors: Samuel Robert Kidd, Auckland (NZ); Murray Kidd, Auckland (NZ); Peter Coppinger, Cork (IE); Daniel Mackey, Cork (IE); David Tucker, County Cork (IE); John O'Brien, Cork (IE); Eoghan O'Leary, County Cork (IE)

(73) Assignee: Zingtech Limited, Glanmire, County Cork (IE)

( * ) Notice: Subject to any disclaimer, the term of this patent is extended or adjusted under 35 U.S.C. 154(b) by 0 days.

(21) Appl. No.: 11/290,525

(22) Filed: Dec. 1, 2005

(65) Prior Publication Data
US 2006/0089919 A1  Apr. 27, 2006

Related U.S. Application Data

(63) Continuation of application No. PCT/IE04/00080, filed on Jun. 4, 2004.

(60) Provisional application No. 60/559,960, filed on Apr. 7, 2004, provisional application No. 60/475,496, filed on Jun. 4, 2003.

(51) Int. Cl.
*G06Q 99/00* (2006.01)
(52) U.S. Cl. .............. 705/75; 705/65; 705/67; 705/79; 705/51; 713/182; 713/183; 713/184; 713/185; 726/2; 726/5; 380/277
(58) Field of Classification Search .......... 705/51–79; 713/182–186; 726/2, 5; 380/277
See application file for complete search history.

(56) References Cited

U.S. PATENT DOCUMENTS

| | | | |
|---|---|---|---|
| 6,055,314 A * | 4/2000 | Spies et al. ............. 380/228 |
| 6,477,649 B2 * | 11/2002 | Kambayashi et al. ...... 726/27 |
| 6,980,970 B2 * | 12/2005 | Krueger et al. ............. 705/39 |
| 2002/0026424 A1 * | 2/2002 | Akashi ...................... 705/57 |
| 2002/0128977 A1 | 9/2002 | Nambiar et al. ............ 705/64 |
| 2006/0149683 A1 * | 7/2006 | Shimojima et al. ......... 705/59 |
| 2006/0210084 A1 * | 9/2006 | Fransdonk ................ 380/278 |

FOREIGN PATENT DOCUMENTS

| | | |
|---|---|---|
| EP | 0921487 A2 | 6/1999 |
| EP | 1061484 A2 | 12/2000 |
| WO | WO02/17181 | 2/2002 |
| WO | WO02/093508 | 11/2002 |

OTHER PUBLICATIONS

Indermaur, Kurt, "The Set Protocol", Sep. 1997, DBMS.*

* cited by examiner

*Primary Examiner*—Jalatee Worjloh
(74) *Attorney, Agent, or Firm*—Jacobson Holman PLLC

(57) ABSTRACT

A customer inserts a security device (D) into the USB port of his computer (C). When a transaction request confirmation (1) is transmitted to a merchant server (M), the merchant server (M) instructs an account server (AS). The account server (AS) performs customer verification, and payment (either with a local account or remote financial institute server). The account server (AS) communicates directly (3, 5) with the customer computer (C) with an encryption mechanism utilising security data read from the security device (D) and a time stamp. A security key for the security device is updated after each transaction and an embedded hardware key is also used.

19 Claims, 5 Drawing Sheets

TRANSACTION PROCESSING

This is a continuation of PCT/IE04/000080 filed Jun. 4, 2004 and published in English, claiming benefit of US provisional application No. 60/475,496, filed Jun. 4, 2003 and US provisional application No. 60/559,960, filed Apr. 7, 2004.

FIELD OF THE INVENTION

The invention relates to processing of transactions such as purchase transactions.

PRIOR ART DISCUSSION

One of the problems with conducting transactions over a wide area network such as the Internet is that many customers are not comfortable with the notion of financial and account data being transmitted online. This problem has been a major factor in hindering the growth of Internet shopping.

Approaches to address this problem have not to date achieved widespread success. For example, single-use or limited-use credit cards assist with security in some situations. However, they require the user to purchase the credit card in advance of every purchase or group of purchases. Other disadvantages with existing approaches are inter alia the inability to counteract repudiation.

WO02/03286 A1 describes a method and system for electronic payment transactions. There are interactions between a customer computer, a physical security device, an independent agent, and a financial institution. The customer computer orders an item from the merchant and then, with authentication of the physical key, transmits a message to the trusted agent.

The invention is directed towards providing for simpler transaction processing with enhanced security.

SUMMARY OF THE INVENTION

According to the invention, there is provided a transaction processing method carried out by a customer terminal, a merchant server, and an account server, wherein, the merchant server transmits an instruction to the account server upon receipt of a transaction request confirmation; and the account server communicates directly with the customer terminal for customer verification and payment processing.

In one embodiment, the verification includes physical connection of a physical security device in the customer terminal, and the customer terminal reading security data from the security device.

In another embodiment, the customer terminal generates a customer prompt for insertion of the security device using a program downloaded from the account server.

In a further embodiment, the customer terminal transmits the security data to the account server AS for customer recognition and verification.

In one embodiment, the security data is hashed, the hash is transmitted, the account server independently generates a hash with the same algorithm based on a local database record of the security data, and verifies the customer if the hashes match.

In another embodiment, the customer terminal uses a current real time stamp together with the security data to generate the hash and the account server uses the same time stamp to generate its hash.

In a further embodiment, the customer terminal transmits the time stamp together with its hash, and the account server uses this time stamp to independently generate its hash.

In one embodiment, data transmitted between the customer terminal and the account server is encrypted.

In another embodiment, the encryption is performed using information stored on both the customer terminal and the account server.

In a further embodiment, both the customer terminal and the account server perform a second encryption according to an encryption protocol, for double encryption.

In one embodiment, said protocol is the HTTPS protocol.

In another embodiment, the security data includes a hardware key embedded in the security device in non-editable and non-erasable form.

In a further embodiment, the hardware key is recorded in a database of the account server when the security device is issued to the customer.

In one embodiment, the security data includes a software key, and the method comprises the further steps of both the customer terminal and the account server synchronously changing the software key.

In another embodiment, the software key is updated after at least some transactions involving the customer terminal.

In a further embodiment, the account server generates an updated software key after at least some transactions and transmits it, in encrypted form, to the customer terminal, and the customer terminal updates it to the security device.

In one embodiment, the customer terminal requires customer input of a PIN code, and checks the inputted PIN code against a code stored on the security device.

In another embodiment, the customer terminal displays a virtual keypad for customer input of the PIN code.

In a further embodiment, location of the virtual keypad on the screen in dynamically charged from time to time.

In one embodiment, the account server directs the customer terminal to download a program for transaction processing.

In another embodiment, the account server performs payment operations in communication with a remote financial institution server.

The invention provides a security device for performing security device operations of a method as defined above.

The invention also provides an account server for performing account server operations of a method as defined above.

The invention also provides a merchant server for performing merchant server operations of a method as defined above.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
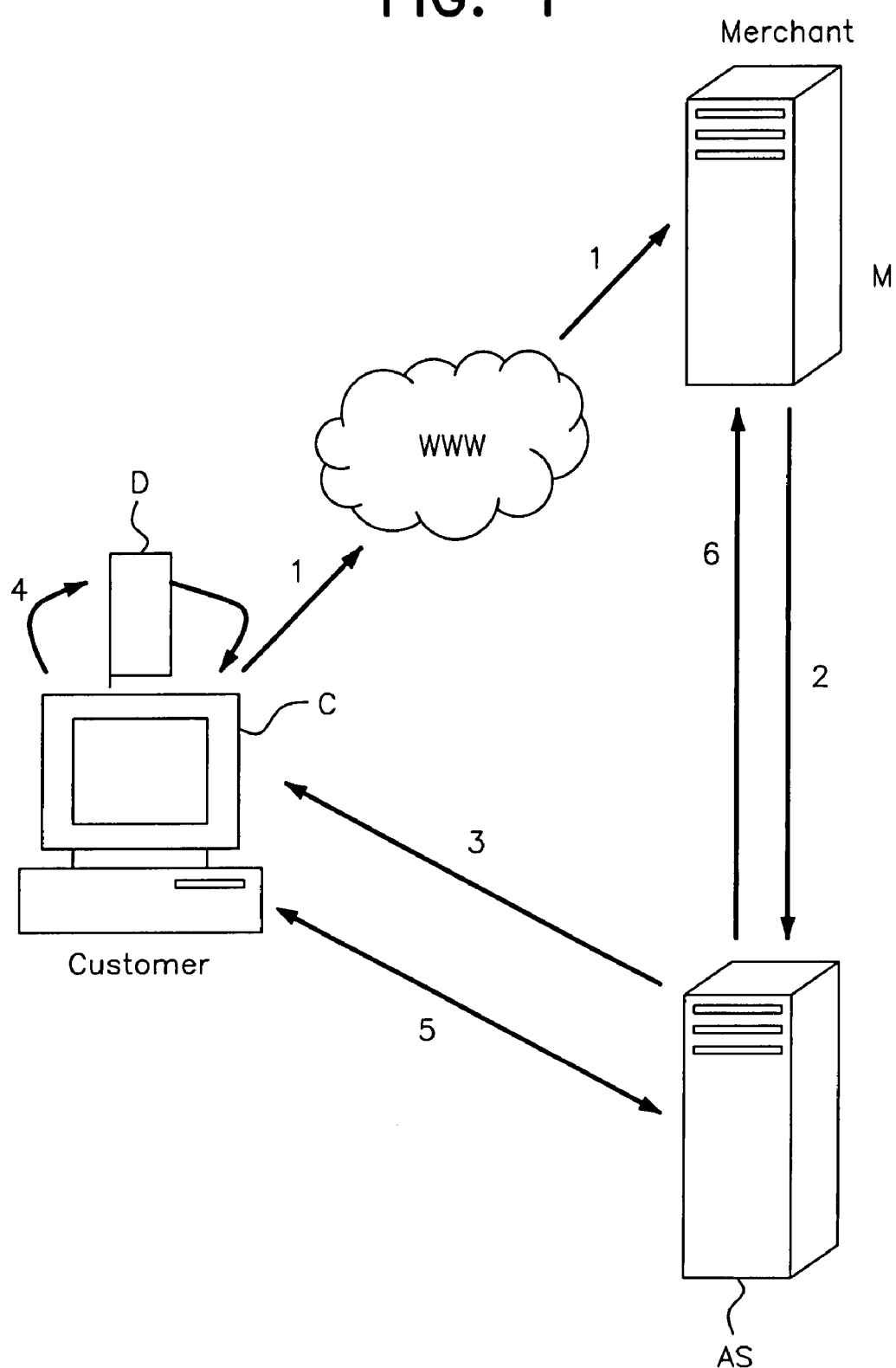
FIG. 1 is a schematic diagram showing signals for completion of a transaction processing method of the invention.
Figure 2:
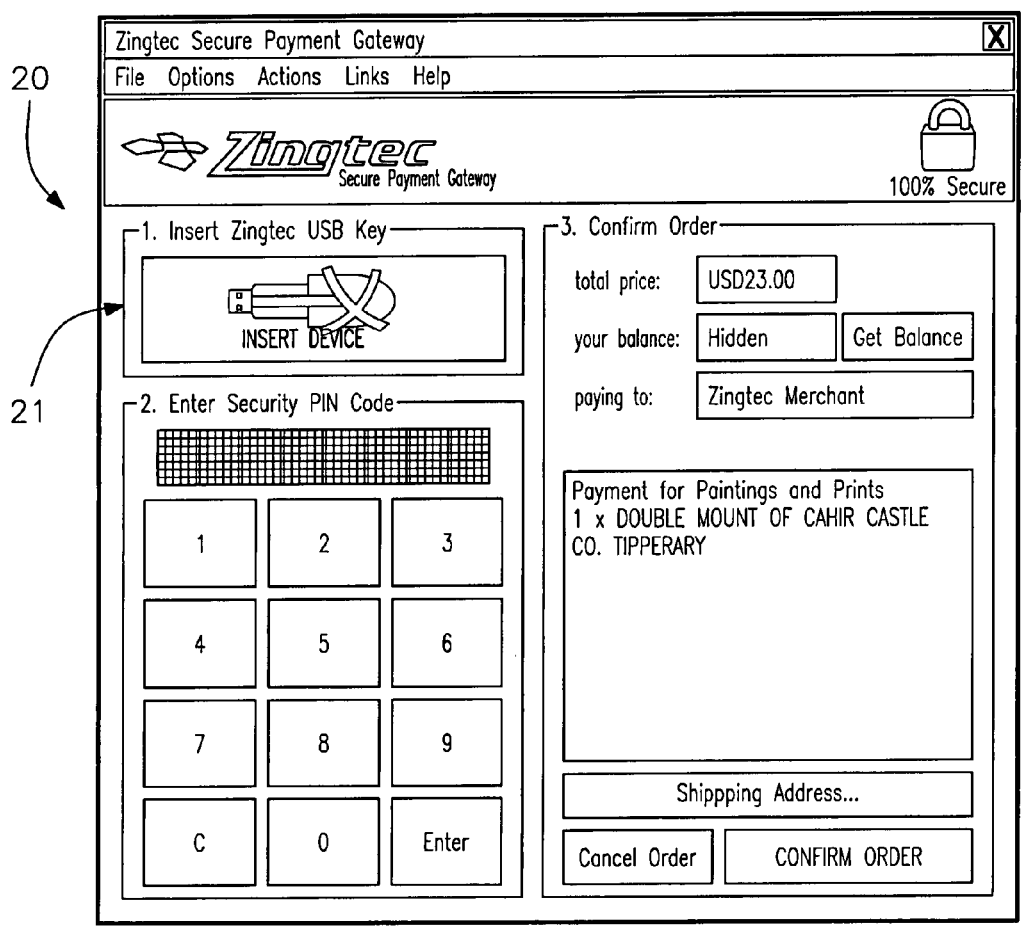
FIGS. 2 to 5 are a series of screen shots generated during execution of the method.

Referring to FIG. 1 a transaction processing method is performed by:
- a customer computer C,
- a customer security device D which may be plugged into the customer computer's USB port,
- a merchant server M, and
- an account server AS.

While in this embodiment the customer uses a computer, he or she may alternatively use a different device or terminal such as a PDA or a mobile phone. Any device with computing and communication capability and a hardware device port could be used. Also, the role of the customer computer C and the merchant server M may alternatively be played by a merchant system in a "bricks and mortar" premises.

The device D is a hardware circuit storing customer-specific security data. This data includes the latest 1024 byte unique identifier for the customer and is referred to as the SOFTWARE KEY. This key is also stored on the account server AS and is unique to each customer. This key is generated by the account server AS and is transferred to the device D prior to the initial transaction. The device D also has a unique serial number, called a HARDWARE KEY, built into it during manufacture. The hardware architecture of the device D comprises an embedded memory.

Before using the system the customer registers transaction information with the server AS. The transaction information includes account data and the customer is assigned a customer ID and the security device with the SOFTWARE KEY, which includes the assigned customer ID. The server AS also stores the serial number of the assigned hardware device (HARDWARE KEY) for future validation. The server AS sets up a deposit account for the customer, or alternatively establishes links with an external financial system which manages the deposit account.

Transaction Steps place an order the customer simply uses an ecommerce site in a conventional manner to purchase from the merchant M. The following are the steps:

1: On the merchant server's checkout page, the customer can select to pay via a "Secure Payment System". The merchant server M is configured to route the computer C to a payment page of the server AS when this option is selected. This page is shown in FIGS. 2 to 5. For ease of use the same page is displayed throughout, merely with different steps being indicated in sections of the screen.

2: The merchant server M routes the computer C to the account server AS and sends information about the current order including the merchant's ID, a description of the goods and the price.

3: When the server AS is sent information from the merchant server M, the server AS registers the information it receives in a database and assigns a unique transaction ID. The server AS returns HTML data to the computer C and attempts to start payment gateway software on the customer computer C by sending instructions to the computer C to load the software, an activeX control.

If this software is not already installed on the customer computer C, the customer will either be given instructions on how to download the software or the software will begin to install automatically. This software generates the display 20 of FIG. 2 on the screen of the customer computer C, prompting insertion of the security device in a window 21.

4: The computer C, executing the ActiveX program, validates that the security device D is inserted and reads the customer's ID and the SOFTWARE KEY into memory. The program also reads the HARDWARE KEY (serial number of the device D).

Figure 3:
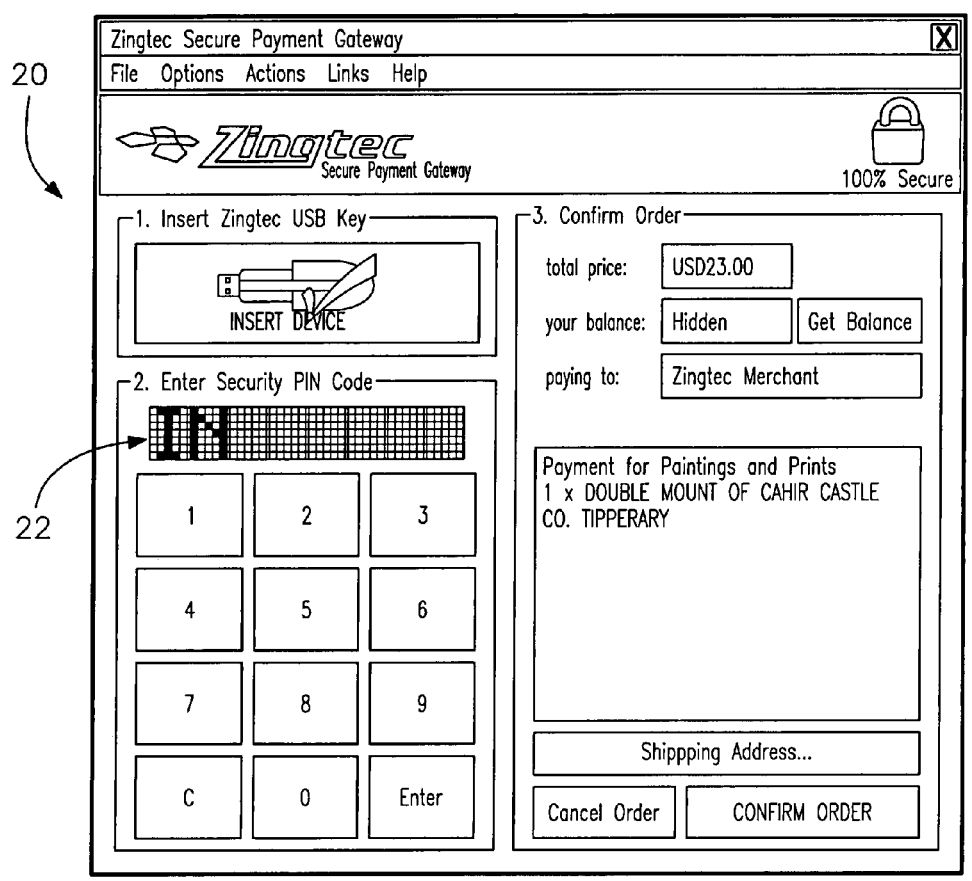
Figure 4:
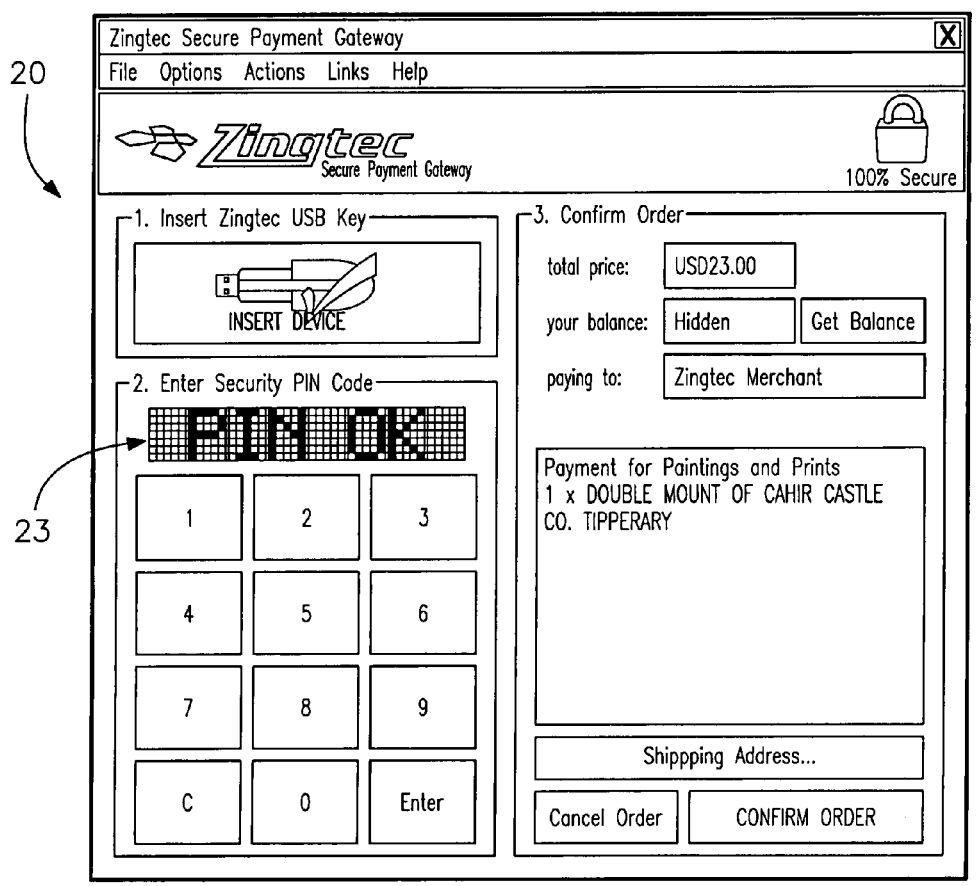

Once the SOFTWARE KEY is validated the program requests the user to enter his or her PIN, as shown by the screen of FIG. 3 at 22, and PIN approval being indicated at 23 in the screen of FIG. 4.

5: Upon customer selection of "Confirm Order" or "Check Balance" options the computer C transmits authentication data to the server AS in encrypted form. This authentication involves generation of a one-way hash code based on the following components: the customer's PIN, the SOFTWARE KEY, the customer ID, the HARDWARE KEY, the current date and time, and the transaction ID. The one-way hash code is sent to the server AS and the server AS builds its own version of the one-way hash code using matching information it has available in it's database. The account server AS then compares the two hashes to authenticate the user. If the two hashes don't match, the server AS informs the computer C that the authentication failed.

If "Check Balance" is selected, the computer C transmits an encrypted message to the server AS to request a balance check. The message is encrypted using the PIN and the other customer data. Upon receipt of the request message, the server AS verifies the customer, and returns back the balance.

If the customer confirms a purchase, the server AS verifies the customer as set out above. The server AS updates its database to mark the transaction as started. To approve the transaction the server AS accesses a relevant deposit account, which it holds on behalf of the customer. Alternatively, it accesses a remote financial system to determine if funds are present. It transmits an approval or non-approval message to the computer C as appropriate.

To finalise an order, the server AS contacts the merchant server M (by posting form data to a hidden page) to inform the merchant server that the order is complete. The merchant server M verifies itself using a method similar to the one described above involving generating a hash code. The merchant server M is expected to reply with the simple message "YES", to indicate that it has updated its records to indicate that the order is complete. If the merchant server cannot be contacted the account server AS informs the computer C that the transaction has failed. If the merchant server was contacted the message returned by the merchant server M will in turn be returned by the account server AS to the computer C.

Also, before final approval of the transaction request, the server AS transmits a new SOFTWARE KEY to the device D. The device D verifies that it has the key and transmits a verification message to the server AS.

Figure 5:
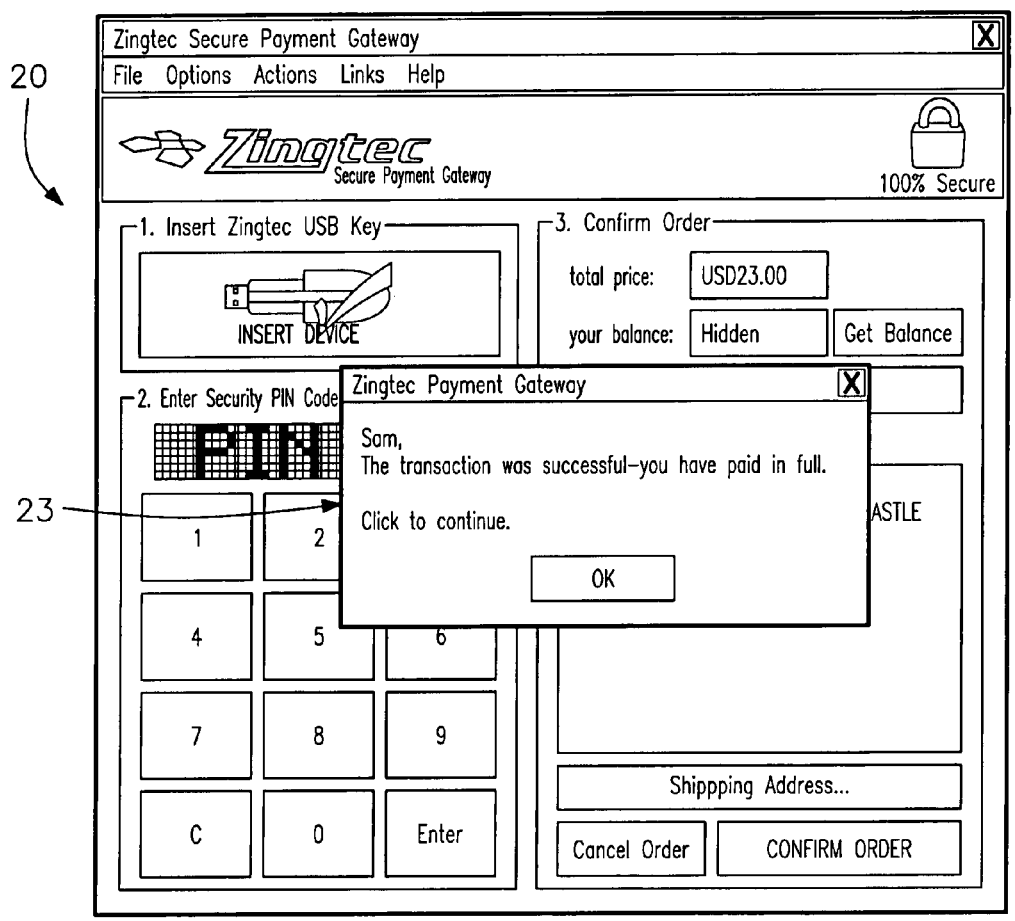

The server AS then approves the transaction for the merchant system M, and the computer C generates a window 24 such as shown in FIG. 5. After completion of the transaction, the server AS transmits electronic payment to the merchant system M in a batch mode.

Security

An advantageous aspect of the method is that the customer makes inputs by "clicking" graphics on screen, including keypad graphics with numbers. Also, the locations of the graphics on the screen are optionally randomised by the computer C program. This prevents "Trojan" software programs that monitor keyboard taps from obtaining the customer's PIN and removes a possibly insecure link.

The server AS is linked with a Web server to allow user maintenance of the account. If the security device D is lost or stolen, the customer may cancel future transactions until it has been replaced.

In the above method, there is encryption between the customer device C and the server AS. This is performed using secure HTTPS client-server communication and also internal encryption: thus giving double encryption.

A large degree of security is achieved because, after the initial purchase request 1, subsequent communications involving the customer computer C are with the server AS. These communications are all encrypted using information which is known only by the computer C and the server AS. The computer C builds a hash using a number of items of sensitive data and a time stamp. The hash is transmitted together with the plain time stamp to the server AS. The server AS builds its own version of the hash, using its record of the same sensitive data and the plain time stamp received from the computer C. If the customer is valid then both hashes should match. Thus, there is no communication of sensitive data, only of hashes. Also, any one hash is unique because a current time stamp is involved in its generation.

The features for communication between the customer computer C and the server AS apply also for communication between the merchant server M and the server AS. At least one of the M-to-AS links involves having an order identifier together with a time stamp.

It will be noted that, after the initial order confirmation, transaction communication is between the customer computer and the server AS. This communication is very safe because the mechanism described above does not involve transmission of sensitive data, and the hashes which are transmitted are double encrypted.

The SOFTWARE KEY used during the transaction process cannot be used again. The security device D receives a new SOFTWARE KEY after each transaction. The server AS also logs the transaction on behalf of the customer in the database, and this is used later for generation of a statement. The transaction data includes device-specific data, merchant-specific data, date and time.

It will be appreciated that the invention provides comprehensive security for customer data, helps to prevent fraud on merchants, and also allows convenient shopping by the customer.

The invention is not limited to Internet shopping. The device D could alternatively be used for conventional shopping at a retailer's premises. The customer presents the device D to the retailer at the point-of-sale, it is plugged into the point-of-sale system, and the system accesses the server AS in a manner akin to the set out above.

The invention is not limited to the embodiments described but may be varied in construction and detail.

The invention claimed is:

1. A transaction processing method carried out by a customer terminal, a merchant server, and an account server, wherein, the merchant server transmits an instruction to the account server upon receipt of a transaction request confirmation;

the account server communicates directly with the customer terminal for customer verification and payment processing;

wherein the verification includes physical connection of a physical security device in the customer terminal, and the customer terminal reading security data from the security device;

wherein the customer terminal generates a customer prompt for insertion of the security device using a program downloaded from the account server;

wherein the customer terminal transmits the security data to the account server for customer recognition and verification;

wherein the security data is hashed, the hash is transmitted, the account server independently generates a hash with the same algorithm based on a local database record of the security data, and verifies the customer if the hashes match;

wherein the security data includes a software key, and the method comprises the further steps of both the customer terminal and the account server synchronously changing the software key; and wherein the software key is updated after at least some transactions involving the customer terminal.

2. The transaction processing method as claimed in claim 1, wherein the customer terminal uses a current real time stamp together with the security data to generate the hash and the account server uses the same time stamp to generate its hash.

3. The transaction processing method as claimed in claim 1, wherein the customer terminal uses a current real time stamp together with the security data to generate the hash and the account server uses the same time stamp to generate its hash; and wherein the customer terminal transmits the time stamp together with its hash, and the account server uses this time stamp to independently generate its hash.

4. The transaction processing method as claimed in claim 1, wherein data transmitted between the customer terminal and the account server is encrypted.

5. The transaction processing method as claimed in claim 4, wherein the encryption is performed using information stored on both the customer terminal and the account server.

6. The transaction processing method as claimed in claim 4, wherein the encryption is performed using information stored on both the customer terminal and the account server; and wherein both the customer terminal and the account server perform a second encryption according to an encryption protocol, for double encryption.

7. The transaction processing method as claimed in claim 4, wherein the encryption is performed using information stored on both the customer terminal and the account server; and wherein both the customer terminal and the account server perform a second encryption according to an encryption protocol, for double encryption; and wherein said protocol is the HTTPS protocol.

8. The transaction processing method as claimed in claim 1, wherein the security data includes a hardware key embedded in the security device in non-editable and non-erasable form.

9. The transaction processing method as claimed in claim 8, wherein the hardware key is recorded in a database of the account server when the security device is issued to the customer.

10. The transaction processing method as claimed in claim 1, wherein the account server generates an updated software key after at least some transactions and transmits it, in encrypted form, to the customer terminal, and the customer terminal updates it to the security device.

11. The transaction processing method as claimed in claim 1, wherein the customer terminal requires customer input of a PIN code, and checks the inputted PIN code against a code stored on the security device.

12. The transaction processing method as claimed in claim 1, wherein the customer terminal requires customer input of a PIN code, and checks the inputted PIN code against a code stored on the security device; and wherein the customer terminal displays a virtual keypad for customer input of the PIN code.

13. The transaction processing method as claimed in claim 1, wherein the customer terminal requires customer input of a PIN code, and checks the inputted PIN code against a code stored on the security device; and wherein the customer terminal displays a virtual keypad for customer input of the PIN code; and wherein location of the virtual keypad on the screen in dynamically charged from time to time.

14. The transaction processing method as claimed in claim 1, wherein the account server directs the customer terminal to download a program for transaction processing.

15. The transaction processing method as claimed in claim 1, wherein the account server performs payment operations in communication with a remote financial institution server.

16. The security device comprising means for performing security device operations of a method of claim 1.

17. The account server comprising means for performing account server operations of a method of claim 1.

18. The merchant server comprising means for performing merchant server operations of a method of claim 1.

19. The computer readable medium comprising software code for performing the steps of the method of claim 1 when executing on a digital processor.

* * * * *